(12) United States Patent
Lai et al.

(10) Patent No.: US 7,085,876 B2
(45) Date of Patent: Aug. 1, 2006

(54) USB CONTROLLING APPARATUS FOR DATA TRANSFER BETWEEN COMPUTERS AND METHOD FOR THE SAME

(75) Inventors: Ching-Chung Lai, Taipei (TW); Hung-Pin Chen, Taipei (TW)

(73) Assignee: VIA Technologies, Inc., Taipei (TW)

( * ) Notice: Subject to any disclaimer, the term of this patent is extended or adjusted under 35 U.S.C. 154(b) by 252 days.

(21) Appl. No.: 10/617,722

(22) Filed: Jul. 14, 2003

(65) Prior Publication Data
US 2004/0148451 A1 Jul. 29, 2004

(30) Foreign Application Priority Data
Jan. 28, 2003 (TW) .............................. 92101753 A

(51) Int. Cl.
*G06F 13/00* (2006.01)
*G06F 13/40* (2006.01)
*G06F 3/00* (2006.01)

(52) U.S. Cl. .......................... 710/313; 710/8; 710/14; 710/104; 710/110; 710/305; 710/316

(58) Field of Classification Search ............... 710/8, 710/31, 38, 62, 72, 104, 305, 313, 316
See application file for complete search history.

(56) References Cited

U.S. PATENT DOCUMENTS

| | | | | |
|---|---|---|---|---|
| 5,784,581 | A * | 7/1998 | Hannah ....................... | 710/110 |
| 6,076,119 | A * | 6/2000 | Maemura et al. ............. | 710/15 |
| 6,230,226 | B1 * | 5/2001 | Hu et al. .................... | 710/305 |
| 6,549,958 | B1 * | 4/2003 | Kuba ........................... | 710/14 |
| 6,732,218 | B1 * | 5/2004 | Overtoom et al. .......... | 710/313 |
| 6,820,166 | B1 * | 11/2004 | Kitagawa ..................... | 710/316 |
| 2003/0023804 | A1 * | 1/2003 | Matsuda et al. ............. | 710/313 |
| 2003/0030412 | A1 * | 2/2003 | Matsuda et al. ............. | 320/127 |
| 2003/0104835 | A1 * | 6/2003 | Douhet ....................... | 455/557 |
| 2003/0204652 | A1 * | 10/2003 | Saito et al. ................... | 710/33 |
| 2003/0212841 | A1 * | 11/2003 | Lin ............................. | 710/62 |
| 2004/0153597 | A1 * | 8/2004 | Kanai et al. ................. | 710/305 |

FOREIGN PATENT DOCUMENTS

JP 2000196986 A * 7/2000

(Continued)

OTHER PUBLICATIONS

Dallas Semicunductors; "USB On-The-Go Basics"; Dallas Semicunductors; Dec. 20, 2002; available online at <http://pdfserv.maxim-ic.com/en/an/AN1822.pdf>.*

*Primary Examiner*—Paul R. Myers
*Assistant Examiner*—Ryan Stiglic
(74) *Attorney, Agent, or Firm*—Rosenberg, Klein & Lee

(57) ABSTRACT

A USB controlling apparatus for data transfer between computers and method for the same are provided. The apparatus comprises a host controller providing a host function of USB interface; a device function circuit providing a device function of USB interface; at least one connection for connecting to a USB device or a USB cable by way of data transfer; and a path switch unit. The path switch unit connected to the host controller, device function circuit and the USB data lines, used to switch a connection path of the USB data lines between the host controller and the device function circuit, which is able to provide a host function mode to connect USB apparatus for data transmitting or a device function mode to connect with other computer host for data transmitting.

4 Claims, 4 Drawing Sheets

FOREIGN PATENT DOCUMENTS

JP 2003044186 A * 2/2003

JP 2003263253 A * 9/2003

* cited by examiner

USB CONTROLLING APPARATUS FOR DATA TRANSFER BETWEEN COMPUTERS AND METHOD FOR THE SAME

FIELD OF THE INVENTION

The present invention relates to a USB controlling apparatus and method for the same, more particularly to a USB controlling apparatus for data transfer between computers and method for the same, the USB controlling apparatus being provided with a device function circuit and a path switch to enable a computer to have both host and device function.

BACKGROUND OF THE INVENTION

USB (universal serial bus) interface allows for plug-and-play function, up to 127 physical devices connection, provision of 5V electrical power and requires only one IRQ. Therefore, USB becomes standard interface for nowadays computer. Moreover, the USB 2.0 can provide high data transfer rate of 480 Mbps and is feasible for higher-performance peripheral such as scanners, printers and storage devices.

The conventional ways of data transfer between computers rely on cable connected between printer ports of computers or connected between network interfaces cards of computers. However, the data transfer rate is low by above conventional ways and network interfaces card is required for latter approach. As the prevailing of USB interface, it is proposed to use USB interface for data transfer between computers.

The USB interface is functioned with the master/slave architecture. Therefore, the data transfer between a computer and a peripheral can be established only after the computer is recognized to be a host and the peripheral is recognized to be a device.

To provide data transfer between computers through USB interface, a USB bridge 16 is provided between two computers 12 and 18, as shown in FIG. 1. The USB bridge 16 is connected to a host controller 123 of the computer 12 through a USB cable 141, and connected to a host controller 183 of the computer 18 through a USB cable 143. In this scheme, both of the computers 12 and 18 provide host function and the USB bridge 16 provides device function to establish data transfer between the two computers 12 and 18.

In above approach, one USB bridge and two USB cables are required to achieve data transfer between two computers. It costs higher expense and is inconvenient for user.

Moreover, the USB bridge is further modified to incorporate into a USB cable. However, the USB cable with bridging function has higher cost and cannot be used for data transfer between computer and peripheral.

SUMMARY OF THE INVENTION

It is the object of the present invention to provide a USB controlling apparatus for data transfer between computers, wherein the computer using the USB controlling apparatus has both host function and device function.

In one aspect of the present invention, the USB controlling apparatus has a device function circuit to provide a device function for USB interface of a computer. The computer can communicate data with another computer through the USB controlling apparatus.

In another aspect of the present invention, the USB controlling apparatus has a path switch to switch a path to the device function circuit or a host controller. Therefore, a computer using the USB controlling apparatus can transfer data to a peripheral or another computer.

In still another aspect of the present invention, the USB controlling apparatus has a power switch, a pull-up resistor and a pull-up switch, which are turned on/off during device function mode or host function mode of a computer using the USB controlling apparatus. Therefore, the connection status of the computer with a peripheral or another computer can be sensed.

In still another aspect of the present invention, the device function mode or the host function mode of a computer using the USB controlling apparatus can be manually or automatically set.

In still another aspect of the present invention, a predetermined waiting time is set for limiting a time duration to check connection status of the computer with a peripheral or another computer. The computer is automatically and alternatively switched to device function mode or host function mode if the connection is not established within the predetermined waiting time.

The various objects and advantages of the present invention will be more readily understood from the following detailed description when read in conjunction with the appended drawing, in which:

DETAILED DESCRIPTION OF THE INVENTION

Figure 1:
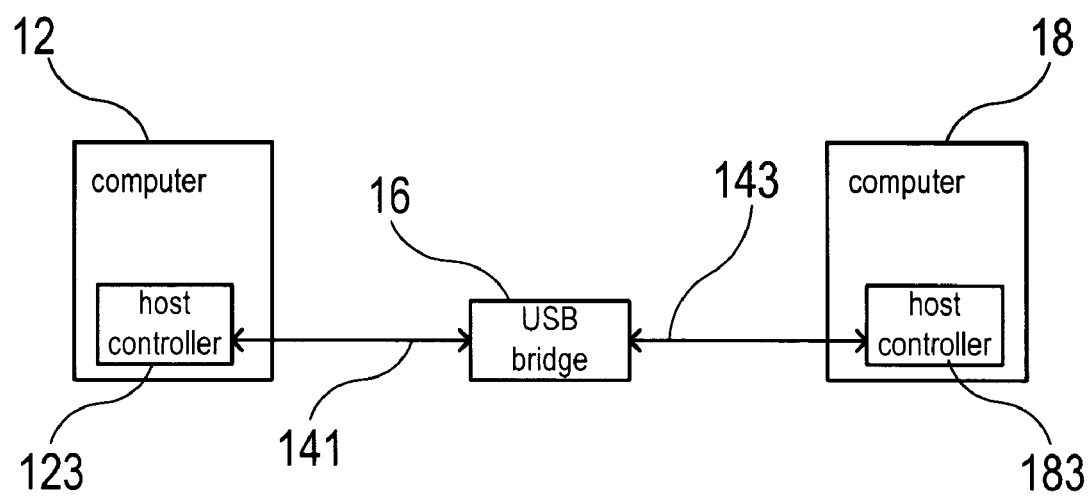
FIG. 1 shows a schematic diagram of a prior art USB interface for data transfer between computers.
Figure 2:
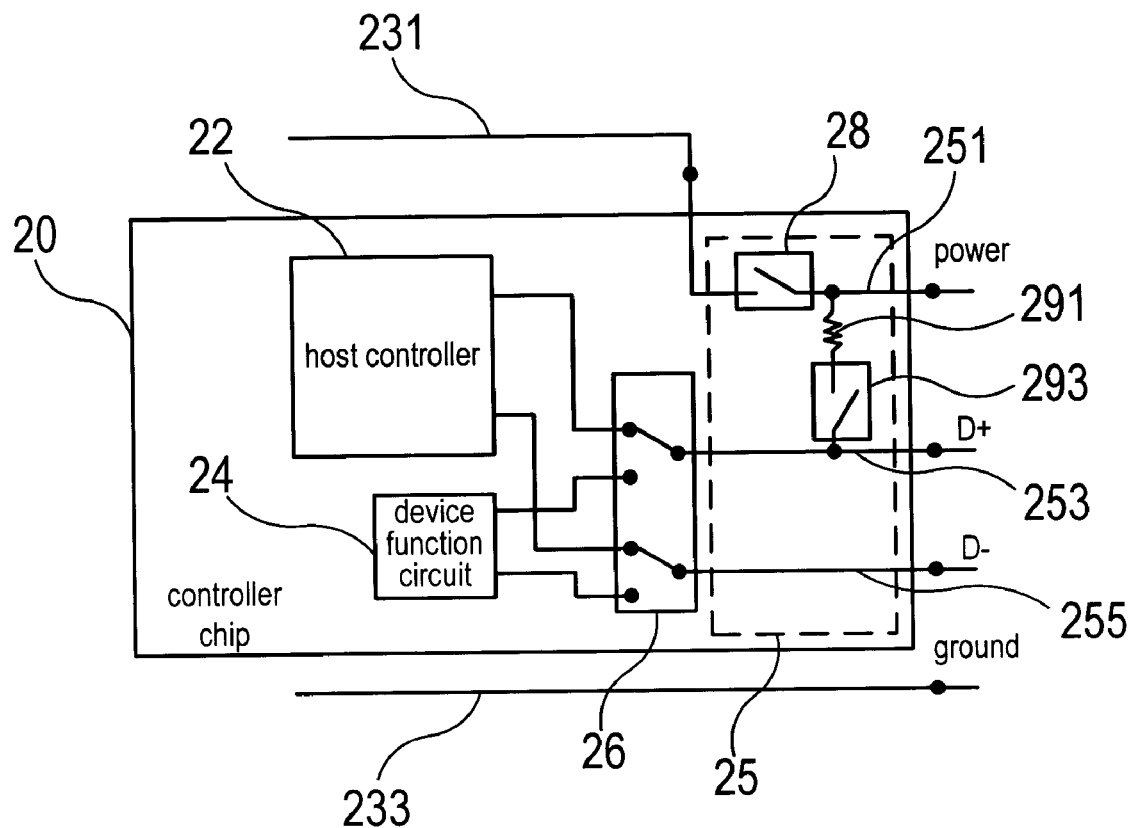
FIG. 2 shows a schematic diagram of a first preferred embodiment of the present invention.

FIG. 2 shows a schematic diagram of a first preferred embodiment of the present invention. The USB control apparatus according to this preferred embodiment is implemented into a controller chip 20. The controller chip 20 comprises a host controller 22 with a USB interface, a device function circuit 24, a path switch 26 and a connection port 25. The connection port 25 comprises at least one set of data lines (data line $D_+$253 and data line $D\_$255) for data transfer. The path switch 26 is connected to the host controller 22, the device function circuit 24 and the data line $D_+$253 and $D\_$255 of the connection port 25. The path switch 26 is functioned to switch a connection path of the connection port 25 between the host controller 22 and the device function circuit 24 when the controller chip 20 is to be switched between a host function mode and a device function mode.

The connection port 25 further comprises a power adapting line 251 with a power switch 28. The power adapting line 251 is connected to the data line $D_+$253 through a pull-up resistor 291 and a pull-up switch 293 in serial connection. The power adapting line 251 is further connected to a USB power line 231 on motherboard to feed electric power to the controller chip 20. The power adapting line 251, together with the data line $D_+$253, the data line $D\_$255 and a ground line 233 of the motherboard, provides USB connection to a peripheral USB device or another computer.

The power switch 28 is turned on and the pull-up switch 293 is turned off when the connection path of the connection port 25 is switched to the host controller 22 by the path switch 26. At this time, the USB interface of the controller chip 20 is operated in the host function mode and has data transfer with a peripheral USB device. The power switch 28 is turned off and the pull-up switch 293 is turned on when the connection path of the connection port 25 is switched to the device function circuit 24 by the path switch 26. At this time, the USB interface of the controller chip 20 is operated in the device function mode and has data transfer with another computer.

Figure 3:
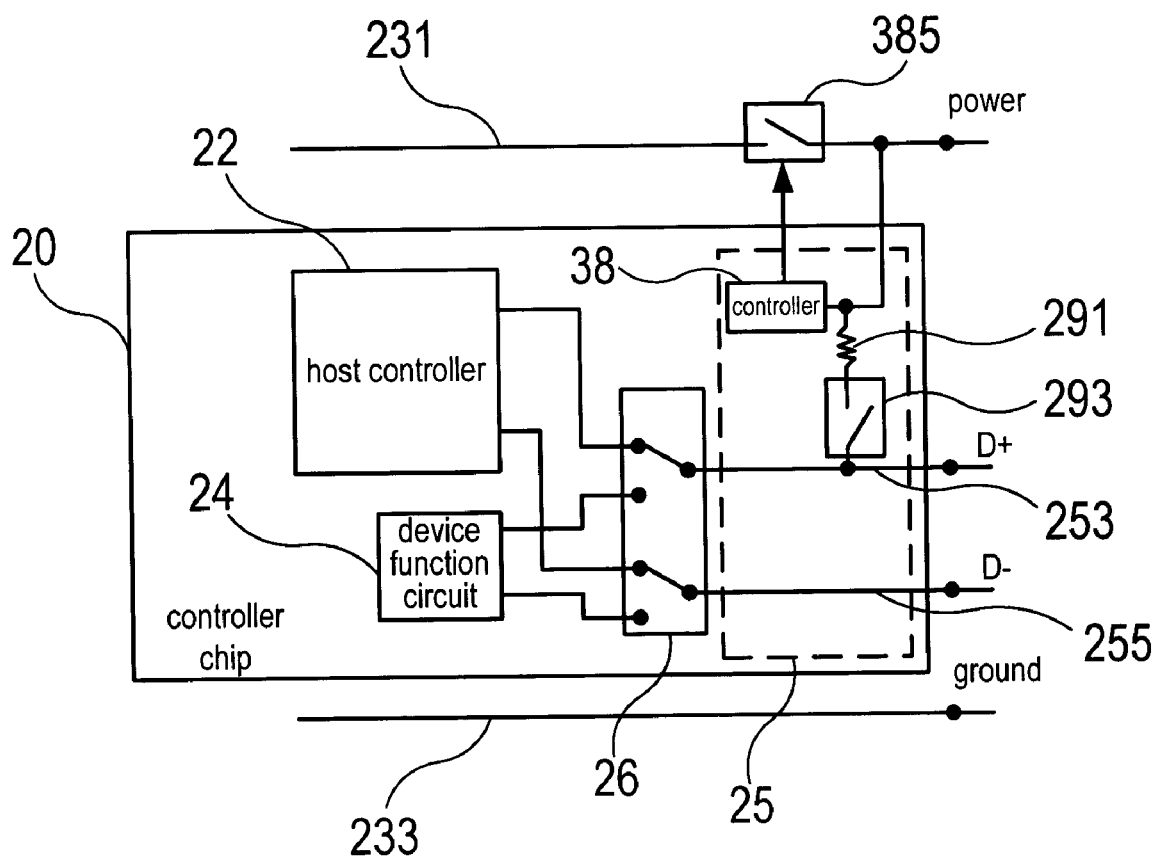
FIG. 3 shows a schematic diagram of a second preferred embodiment of the present invention.

FIG. 3 shows a schematic diagram of a second preferred embodiment of the present invention. The controller chip 20 has similar components as those shown in FIG. 2 except that a power switch 385 is arranged at the USB power line 231 on the motherboard end. Moreover, the connection port 25 further has a power switch controller 38 with input nodes connected to the USB power line 231 and the pull-up resistor 291, respectively, such that the connection port 25 is selectively connected to peripheral USB device and another computer. The power switch controller 38 has output node connected to the power switch 385 to control the turning on/off of the power switch 385.

In above-mentioned embodiments, the path switch 26 can be implemented by a multiplexer, while the power switch 28 and the pull-up switch 293 can be implemented by transistor circuit.

Figure 4:
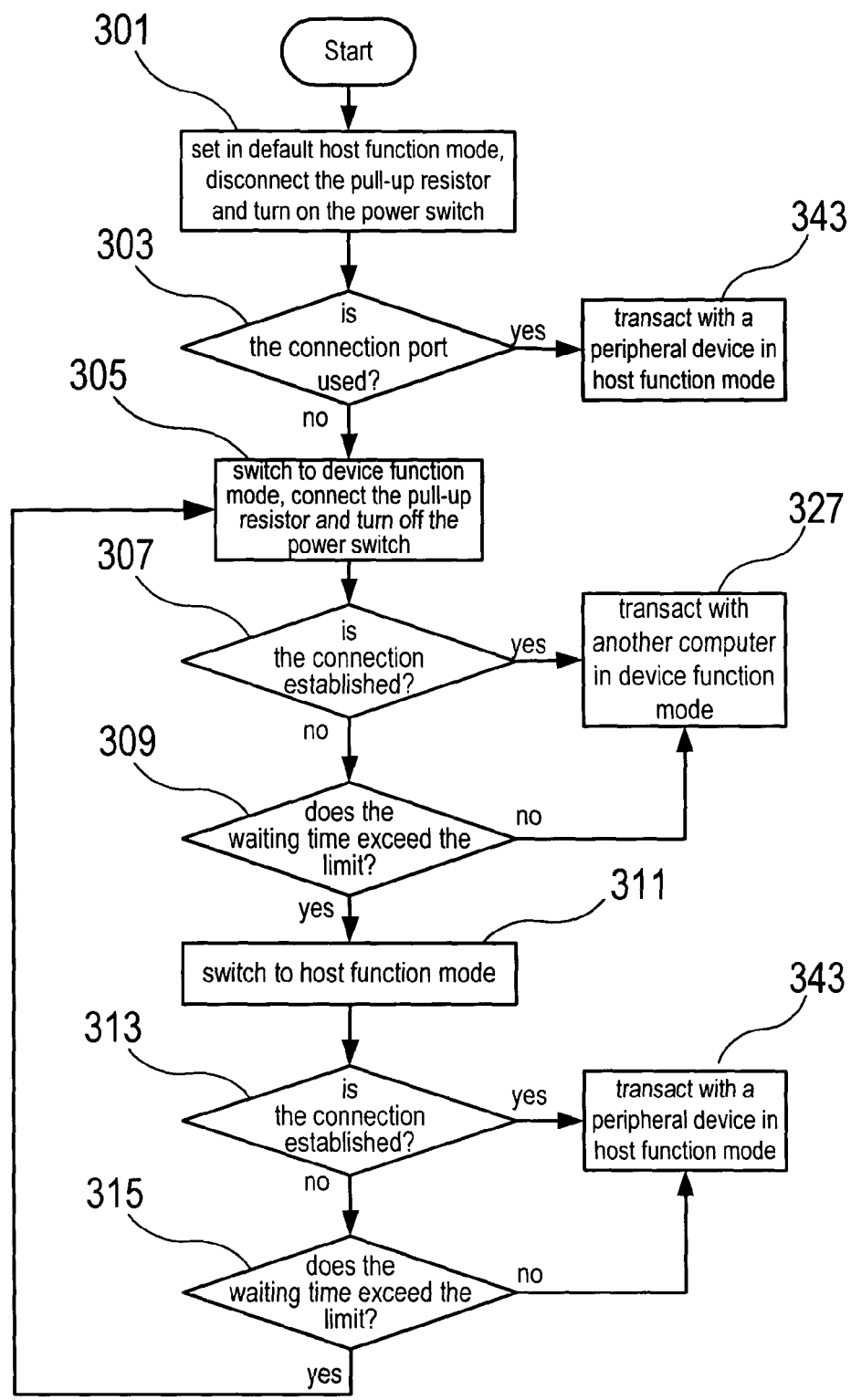
FIG. 4 shows a flowchart of the method according to the present invention.

FIG. 4 shows a flowchart according the method of the present invention. The connection path of the connection port 25 can be switched either in manual operation or automatic operation according to this method.

As shown in FIG. 4, in automatic operation, the default data transfer mode is set to be host function mode in step 301. Moreover, the connection port is switched to the host controller by the path switch, the power switch is turned on and the pull-up switch is turned off in step 301. The process passes next to step 303 for judging whether the connection port is used. If true, the host function mode is sustained and the computer using the controller chip accesses a peripheral device in the host function mode in step 343, else the operation mode of the controller chip is switched to a device function mode in step 305. In step 305, the connection port is switched to the device function circuit by the path switch, the power switch is turned off and the pull-up switch is turned on such that the USB interface of the controller chip is operated as device and to be established connection with another computer.

After step 305, the connection condition of the controller chip to another computer is examined in step 307. If connection is established, the controller chip is functioned as a device connected to another computer and has data transfer with another computer in step 327, else the controller chip keeps waiting and the elapsed time is examined in step 309. If the connection is established in elapsed time within a predetermined time limit, the controller chip is operated in the device function mode and has data transfer with another computer, else the controller chip is switched to host function mode in step 311.

Similarly, in step 313 after step 311, the connection condition of the controller chip to the peripheral device is examined. If the connection is established, the controller chip is functioned as a host connected to the peripheral device and has data transfer with the peripheral device in step 343, else the controller chip keeps waiting and the elapsed time is examined in step 315. If the connection is established in elapsed time within the predetermined time limit, the controller chip is operated in the host function mode and has data transfer with the peripheral device, else the controller chip is switched to device function mode in step 305 and the connection condition is kept examining in succeeding step 307.

The predetermined waiting time limit can be set according to user's requirement. When the computer using the controller chip is operated in host function mode, the detection of connection condition is performed in ordinary detection way.

The above-mentioned preferred embodiments are exemplified with USB 2.0 version (high speed bus) or full speed version of USB 1.1. However, the present invention can also be applied to low speed version, i.e., USB 1.1 as long as another pull-up resistor and pull-up switch are provided between the power adapting line 251 and the data line D_255 and the switch is controlled to turn on/off by software or firmware.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A method for a USB controlling apparatus including at least one connection port having a set of USB data lines for connecting to a USB device or a USB cable for data transfer, a path switch connected to a host controller, a device function circuit and said USB data lines, a power switch having one end connected to a power line on a motherboard and another end connected to a power adapting line, and a series connection of a pull-up resistor and a pull-up switch connected between said power adapting line and one of said set of USB data lines, said method comprising following steps:

setting a host function mode as a default operation mode of said USB controlling apparatus, setting said host function mode includes connecting said data lines to said host controller by said path switch and turning on said power switch and turning off said pull-up switch;

detecting whether a first connection port of said at least one connection ports is being used by said host controller;

when said first connection port is being used by said host controller, said USB controlling apparatus is operated in said host function mode;

when said first connection port is not being used by said host controller, said USB controlling apparatus is switched to operate in a device function mode, operating in said device function mode includes connecting said data lines to said device function circuit by said path switch and turning off said power switch and turning on said pull-up switch;

providing a predetermined waiting time;

detecting whether a connection is established through said first connection port for said USB controlling apparatus;

when said connection is established through said first connection port, said USB controlling apparatus is operated in said device function mode; and, when said connection is not established through said first connection port, examining whether said connection is established within said predetermined waiting time for reconfiguration of said first connection port responsive thereto.

2. The method as in claim 1, further comprising following steps:
   operating said USB controlling apparatus in said device function mode if said connection is established within said predetermined waiting time;
   else switching said USB controlling apparatus to said host function mode if said connection is not established within said predetermined waiting time.

3. The method as in claim 1, wherein said predetermined waiting time is a user-defined value.

4. A method for a USB controlling apparatus including at least one connection port having a set of USB data lines for connecting to a USB device or a USB cable for data transfer, a path switch connected to a host controller, a device function circuit and said USB data lines, a power switch having one end connected to a power line on a motherboard and another end connected to a power adapting line, and a series connection of a pull-up resistor and a pull-up switch connected between said power adapting line and one of said set of USB data lines, said method comprising following steps:
   setting a host function mode as a default operation mode of said USB controlling apparatus, setting said host function mode includes connecting said data lines to said host controller by said path switch and turning on said power switch and turning off said pull-up switch;
   detecting whether a first connection port of said at least one connection ports is being used by said host controller;
   when said first connection port is being used by said host controller, said USB controlling apparatus is operated in said host function mode;
   when said first connection port is not being used by said host controller, said USB controlling apparatus is switched to operate in a device function mode, operating in said device function mode includes connecting said data lines to said device function circuit by said path switch and turning off said power switch and turning on said pull-up switch;
   providing a predetermined waiting time;
   detecting whether a connection is established for said USB controlling apparatus;
   when said connection is established, said USB controlling apparatus is operated in said device function mode;
   when said connection is not established, examining whether said connection is established within said predetermined waiting time;
   operating said USB controlling apparatus in said device function mode if said connection is established within said predetermined waiting time;
   else switching said USB controlling apparatus to said host function mode if said connection is not established within said predetermined waiting time;
   detecting whether a connection is established for said USB controlling apparatus;
   if true, said USB controlling apparatus is operated in said host function mode;
   else examining whether said connection is established within said predetermined waiting time;
   operating said USB controlling apparatus in said host function mode when said connection is established within said predetermined waiting time.
   switching said USB controlling apparatus to said device function mode when said connection is not established within said predetermined waiting time.

* * * * *